3,413,282
METHOD OF PREPARING 5'-NUCLEOTIDES

Masaharu Yoshikawa, Koji Kusashio, and Tetsuya Kato, Kanagawa-ken, and Tadao Takenishi, Tokyo, Japan, assignors to Ajinomoto Co., Inc., Tokyo, Japan
No Drawing. Filed Mar. 29, 1966, Ser. No. 538,204
Claims priority, application Japan, May 31, 1965, 40/18,254
9 Claims. (Cl. 260—211.5)

ABSTRACT OF THE DISCLOSURE

The reaction between ribonucleosides having free hydroxyl groups in the 2' and 3' positions or of deoxyribonucleosides having a free hydroxyl group in the 3'-position with convention phosphorylating agents preferentially yields the corresponding 5'-phosphates in high yields if the reaction medium contains at least four moles of a tertiary phosphoric acid ester per mol of the nucleoside.

---

The present invention relates to the preparation of 5'-nucleotides, and more particularly, to a method of synthesizing 5'-nucleotides from the corresponding nucleosides.

5'-nucleotides are useful as seasoning materials, and are also used as pharmaceuticals.

It has long been known that 5'-ribonucleotides can be obtained by reacting the corresponding nucleosides with phosphoryl chloride in a pyridine medium (Gulland et al., J. Chem. Soc., 1940, 746). When it was desired to improve the yield of the original process, the hydroxyl groups in the 2' and 3' positions of the nucleoside had heretofore to be protected by acyl radicals or by alkylidene groups.

In our copending application Ser. No. 466,432, filed on June 23, 1965, now U.S. Patent No. 3,347,846, we disclosed that the yield of the basically known reaction between phosphoryl chloride or tetrachloropyrophosphate and nucleosides having protected hydroxyl radicals in positions 2', 3' can be greatly increased by the presence of a trialkyl phosphate in the reaction mixture.

We now have found that the reaction between ribonucleosides and deoxyribonucleosides with the aforementioned phosphorylating agents can be performed successfully without protecting the hydroxyl radicals in the 2' and/or 3' positions of these compounds if an adequate amount of trialkyl phosphate is present in the reaction mixture. The improvement brought about by the instant invention over our earlier method resides in the elimination of two process steps in the conversion of nucleosides to nucleotides, namely the initial masking of the 2' and/or 3'-hydroxyl groups of the nucleosides by acyl or alkylidene groups, and the subsequent hydrolysis of the acyl- or alkylidene derivative of the nucleotide to obtain the latter.

The basic starting materials of the invention are ribonucleosides having hydroxyl groups in the 2' and 3'-positions, including purine ribonucleosides, such as adenosine, xanthosine, inosine, and guanosine; pyrimidine ribonucleosides, such as uridine and cytidine; the corresponding desoxyribonucleosides having free hydroxyl radicals in position 3', such as adenine desoxyribonucleoside, guanine desoxyribonucleoside and thymidine; synthetic riobnucleosides, such as 5-amino-4-carbamoyl-1-β-D-ribofuranosyl imidazole, 2-methyl-mercaptoinosine, 2-N-methylguanosine, 2-N,N-dimethylguanosine, 2-ethyl-mercaptoinosine and 6-chloro-9-β-D-ribofuranosylpurine. According to the present invention, xanthosine can be easily phosphorylated to form 5'-xanthylic acid in very high yields, whereas xanthosine was difficult to phosphorylate by any method known heretofore.

The trialkyl phosphates which are employed in the method of the invention are triesters of phosphoric acid with aliphatic alcohols, such as trimethyl phosphate, triethyl phosphate, tri-n-propyl phosphate, tri-n-butyl phosphate, tri-i-propyl phosphate and other triphosphates of lower alkanols, and their haloalkyl analogs such as tri-β-chloroethylphosphate. Triphosphates of alkanols with more than five carbon atoms are less effective, and the triphosphates of alkanols having more than ten carbon atoms have no measurable effect on the yield or on the reaction rate. The trialkyl phosphate must be used in an amount of more than 4 moles per mole of nucleoside if useful yields are to be obtained. A very large excess of liquid trialkyl phosphate when present has the expected effects of an inert diluent without otherwise interfering with the reaction.

The phosphorylating agents which are used in the present invention are phosphoryl chloride and tetrachloropyrophosphate. The phosphorylating agent is used in an amount of one to five moles, preferably two to three moles. The use of a large excess of phosphoryl chloride favors formation of by-products such as 5',3'-di-phosphate, 5',2'-diphosphate, or 5',3',2'-triphosphate.

The phosphorylation reaction is preferably carried out at tempratures between −30 and +50° C., and the reaction proceeds most favorably between −20 and +30° C.

The yield of 5'-nucleotide can be further increased by the presence of a small amount of acid in the reaction mixture. For this purpose, a small amount of water or alcohol may be added to the phosphoryl chloride used. An acid as such may also be added to the reaction system.

When the reaction mixture is poured into ice-water, the phosphorchloridate initially formed is hydrolized to the 5'-nucleotide, and a salt of the 5'-nucleotide may be recovered from the neutralized hydrolyzate by conventional methods, such as evaporation or ion exchange.

The isomers of the nucleotides synthesized were identified by metaperiodate oxidation, paper chromatography, the action of 5'-nucleotidase from snake venom, ultraviolet absorption spectrum or carbazole reaction.

The following examples are further illustrative of the method of the invention, but it will be understood that the invention is not limited thereto.

Example 1

15 ml. trimethyl phosphate (0.13 mole) were mixed with 2.76 ml. (30 millimoles) phosphoryl chloride. The mixture was cooled to −10° C., and 2.67 g. (10 millimoles) adenosine were added. The reaction mixture was stirred for 2 hours and then poured into ice-water. Adenosine-5'-phosphate was found by paper chromatography to be present in a yield of 88%.

The hydrolyzation mixture was neutralized with sodium hydroxide and passed through a column packed with anion exchange resin (Dowex 1 in the formate form). The adenosine-5'-phosphate adsorbed on the resin was eluted with 0.2 N formic acid solution. The eluate was evaporated to dryness, the residue was dissolved in water, and the solution was purified by treatment with active charcoal.

The sodium adenosine-5'-phosphate obtained weighed 3.12 g. (18% yield). It was identified by ultraviolet and infrared absorption spectra, Rf value, analysis for phosphorus content, and metaperiodate oxidation.

Example 2

A mixture of 5 ml. (44 mM.) trimethyl phosphate and 0.37 ml. (4 mM.) phosphoryl chloride was cooled to 0° C., and 0.57 g. (2 mM.) xanthosine was added. The reaction mixture was stirred for 4 hours and then poured into ice-water. The xanthosine-5'-phosphate of the hydrolyzate corresponded to a yield of 86% as determined by paper chromatography. The nucleotide was identified as the 5'-isomer by metaperiodate oxidation.

Example 3

0.57 g. 6-chloro-9-β-D-ribofuranosyl purine (2 mM.) was treated as in Example 2, and 6-chloro-9-β-D-ribofuranosyl purine-5'-phosphate was produced in a yield of 82% based on the initial amount of purine.

Example 4

To a mixture of 5 ml. triethyl phosphate and 0.37 ml. (4 mM.) phosphoryl chloride, 0.49 g. (2 mM.) uridine was added, and the mixture was held at 30° C. for 4 hours with stirring. The yield of uridine-5'-phosphate was 75%. The nucleotide was identified as the 5'-isomer by metaperiodate oxidation.

Example 5

A mixture of 10 ml. dimethylbutyl phosphate and 0.37 ml. phosphoryl chloride was cooled to 0° C., and 0.63 g. (2 mM.) 2-methylmercaptoinosine (J. Chem. Soc., 1958, 1593) was added to the mixture which was then held at 0° C. for 3 hours. 2-methylmercaptoinosine-5'-phosphate was produced in a yield of 76% as determined by paper chromatography.

Example 6

9 ml. triethyl phosphate were mixed with 1.38 ml. (15 mM.) phosphoryl chloride, and the mixture was cooled to 0° C. 5 millimoles water and 1.34 grams (5 mM.) inosine were added and permitted to react for 6 hours. Otherwise identical reactions were performed in the presence of 5 mM. methanol and in the absence of water respectively. The yields of inosine-5'-phosphate obtained were 91% with water, 87% with methanol, and 71% without either.

Example 7

A mixture of 18 ml. trimethyl phosphate, 4.6 ml. (50 mM.) phosphoryl chloride, 2.2 ml. (30 mM.) acetone, and 0.09 ml. (5 mM.) water was cooled to −5° C., and 2.68 g. (10 mM.) inosine were added to the mixture which was held at the same temperature for 12 hours. It was then poured carefully into water which was kept barely alkaline by additions of NaOH, and the hydrolyzate analyzed by paper chromatography. 2',3'-O-isopropylideneinosine - 5' - phosphate and inosine-5'-phosphate were produced in respective yields of 61% and 27%. The hydrolyzation mixture was adjusted to pH 1.5 with hydrochloric acid, heated to 70° C. for 45 minutes, and treated with anion exchange resin and active charcoal as described in Example 1. Crystals of pure sodium inosine-5'-phosphate weighing 4.15 g. were recovered for a yield of 79% based on the initial inosine.

Example 8

A mixture of 18 ml. triethyl phosphate, 2,76 ml. phosphoryl chloride, 1.47 ml. acetone and 0.054 ml. water was cooled to −5° C. 1.34 g. inosine and 1.42 g. guanosine were added, and the reaction solution was stirred for 10 hours. Triethyl phosphate and unreacted phosphoryl chloride and acetone were removed by extraction with ethyl ether, and the residue was dissolved in water. The pH of the aqueous solution was adjusted to 1.5 with alkali, and it was heated to 70° C. for 45 minutes, whereupon it was found to contain 1.43 g. inosine-5'-phosphate (82% yield) and 1.58 g. guanosine-5'-phosphate (88% yield). The reaction product was treated with anion exchange resin, and then with active charcoal. 1.97 g. disodium inosine-5'-phosphaate 7.5 hydrate and 1.63 g. disodium guanosine-5'-phosphate were obtained in crystalline form.

Example 9

2.84 grams guanosine were added to a mixture of 18 ml. trimethyl phosphate and 2.76 ml. phosphoryl chloride, and the reaction solution was stirred at 10° C. for 6 hours, whereafter it was poured into water to hydrolyze the phosphorochloridate formed. The guanosine-5'-phosphate found by paper chromatography in the hydrolyzation mixture corresponded to a yield of 84%. 3.0 g. disodium 5'-guanylate were recovered (74% yield) after purification with active charcoal.

Example 10

A mixture of 20 ml. trimethyl phosphate and 0.92 ml. phosphoryl chloride was cooled to −5° C. 1.26 g. desoxyinosine was added to the mixture which was stirred for 5 hours. Desoxyinosine-5'-phosphate was produced in a yield of 79% as determined by paper chromatography. The reaction product was treated with anion exchange resin and with active charcoal, and 1.24 g. disodium desoxyinosine-5'-phosphate was recovered as a crystalline powder (66%).

It was identified by ultraviolet and infrared absorption spectra and $R_f$ value.

Example 11

2.6 grams 5-amino-4-carbamoyl-1-β-D-ribofuranosyl imidazole were dissolved in 60 ml. trimethylphosphate, 3.2 g. phosphoryl chloride were added dropwise with cooling, and the reaction mixture was held for 5 hours whereupon it was dissolved in about 30 ml. ice-water, and diluted to 100 ml. with water. A sample of the aqueous solution was spotted on filter paper, developed with a mixture of n-propanol, concentrated ammonia and water (20:12:3 parts by volume), and a spot of $R_f$ value 0.13 was cut out. The spot was eluted with 0.1 N-HCl solution, and the yield of 5-amino-4-carbamoyl-1-β-D-ribofuranosyl imidazole - 5'-phosphate was calculated as 83% from the ultraviolet absorbency of the eluate.

The bulk of the aqueous solution was adjusted to pH 1.5 and passed through a column packed with an anion exchange resin (Dowex 1 in the formate form). The resin was eluted with 0.1 N-formic acid solution, and the eluate was evaporated to dryness. The residue when recrystallized from aqueous ethanol, yielded 2.2 g. pure crystalline 5-amino - 4 - carbamoyl-1-β-D-ribofuranosylimidazole-5'-phosphate (yield 65%). The crystals melted and decomposed at 198–202° C.

An elementary analysis of the crystals had the following results:

Found: C, 31.85%; H, 4.53%; N, 16.40%; P, 8.85%.
Calculated for $C_9H_{15}O_8N_4P$: C, 31.96%; H, 4.47%; N, 16.57%; P, 9.18%.

Example 12

Three 0.26 gram batches of 5-amino-4-carbamoyl-1-β-D-ribofuranosylimidazole were reacted with phosphoryl chloride in the presence of trialkyl phosphate by the procedure of Example 11. Relevant reaction conditions and the results obtained are listed below:

| No. | POCl₃ (ml.) | Solvent (ml.) | Temperature (° C.) | Reaction period (hrs.) | Yield of AICAR (percent) |
|---|---|---|---|---|---|
| 1 | 0.3 | PO(OMe)₃ 2.0 | −5 | 1 | 85 |
| 2 | 0.6 | PO(OMe)₃ 2.0 | −5 | 3 | 90 |
| 3 | 1.0 | PO(OEt)₃ 1.0 | 0 | 5 | 91 |

AICAR: 5-amino-4-carbamoyl-1-β-D-ribofuranosylimidazole-5'-phosphate.
PO(OMe)₃: Trimethyl phosphate.
PO(OEt)₃: Triethyl phosphate.

Example 13

A mixture of 10 ml. tri-β-chloroethyl phosphate and 0.82 ml. tetrachloropyrophosphate was mixed at 30° C. with 0.534 g. adenosine. The solvent and unreacted tetrachloropyrophosphate were removed by extraction with ether after 30 minutes, and the residue was dissolved in water. The yield of adenosine-5'-phosphate in the hydrolyzation mixture amounted to 61% as determined by paper chromatography. The mixture also contained adenosine-3'(2'),5'-diphosphate and adenosine-2'(3')-phosphate in yields of 23% and 7% respectively.

Example 14

A mixture of 6 ml. trimethyl phosphate and 0.18 ml. phosphoryl chloride was cooled to −5° C., and 0.25 g. deoxyinosine was added. After 5 hours, the reaction mixture was poured into water, and deoxyinosine-5′-phosphate was formed in a yield of 73%, together with deoxyinosine-3′,5′-diphosphate in a yield of 6%.

Example 15

2.58 grams 5-amino-4-carbamoyl-1-β-D-ribofuranosylimidazole were dissolved in 100 ml. hot methyl alcohol, and 4.8 g. (30 millimoles) potassium ethyl xanthate were added to the solution. The mixture was heated to 170° C. for 2 hours in a sealed tube. After cooling, 100 ml. water were added to the reaction mixture. The pH of the aqueous solution was adjusted to about 3 by adding 20 ml. Amberlite IR–120 in the hydrogen ion form. The resin was removed by filtration, 20 ml. concentrated ammonia solution were added to the filtrate, and the filtrate was decolorized with activated charcoal. The decolorized solution was evaporated under reduced pressure, unreacted 5-amino-4-carbamoyl-1-β-D-ribofuranosylimidazole was removed from the residue by extraction with methyl alcohol, and the residue was recrystallized from water. The purified crystals obtained weighed 2.1 g. (66.2%) and were identified as the ammonium salt of 2-mercaptoinosine.

An elementary analysis of the crystals had the following results:

Found: C, 37.86%; H, 4.73%; N, 22.08%. Calculated for $C_{10}H_{15}O_5N_5S$: C, 37.55%; H, 4.99%; N, 22.53%.

Ultra-violet absorption spectra of the crystals showed $\lambda$max 231.5 and 294 m$\mu$ at pH 1, $\lambda$max 234 and 289 m$\mu$ at pH 13, and $\lambda$max 296 m$\mu$ at pH 6.

A single spot of $Rf$ value 0.50 was detected on a paper chromatogram made with a mixed solvent of n-propanol-conc. ammonia-water (20:12:3 parts by volume), and also a single spot of $Rf$ value 0.16 was obtained by a mixed solvent of n-butanol-acetic acid-water (4:1:1 parts by volume).

Two grams of ammonium 2-mercaptoinosine were dissolved in 20 ml. water, 2.1 g. 30% $H_2O_2$ solution were added to the aqueous solution, and the mixture was stirred at a temperature between 5 and 10° C. for 15 minutes. The reaction solution was mixed with 30 ml. 30% methylamine solution, and the mixture obtained was heated to 130° C. for 3 hours in an autoclave. The reaction mixture was evaporated in a vacuum, and the residue was recrystallized from water to give 0.86 g. of pure crystalline 2-N-methylguanosine (Biochem. J., 72, 294, 1959).

The above reaction was repeated with 30% dimethylamine solution instead of the methylamine, to produce 0.84 g. pure crystalline 2-N,N-dimethylguanosine (Biochem. J., 72, 294, 1959).

A reaction mixture of 40 ml. trimethyl phosphate, 5.52 ml. phosphoryl chloride, 0.18 ml. water, and 6.22 g. 2-N,N-di-methylguanosine was prepared at −5° C. and was stirred for 4 hours at 0° C. It was then poured in small batches into 500 ml. ice water, whereupon the aqueous solution formed was adjusted to pH 2.0, and passed over a column packed with a resin which is a copolymer of metaphenylenediamine, resorcine and formaldehyde. The desired product was eluated with 0.5 N $NH_4OH$ solution, the eluate was evaporated in a vacuum to a small volume, and 100 ml. ethanol were added to the concentrate. The crystals precipitated were dissolved in water and reprecipitated with alcohol. The pure crystals of 2-N,N-dimethylguanosine-5′-phosphate weighed 3.5 grams and melted at 179–180° C. (decomposed).

Found: C, 30.21%; H, 3.78%; H, 14.91%; P, 6.25%. Calculated for $C_{12}H_{16}O_3N_5P \cdot TNa \cdot 2H_2O$: C, 30.57%; H, 3.40%; H, 14.86%; P, 6.58%.

Ultraviolet absorption spectra of the crystals showed $\lambda$max 267 and 295 (S) m$\mu$ at pH 1.1, $\lambda$max 262 and 288 (S) m$\mu$ at pH 6.6, and $\lambda$max 264 and 284 (S) m$\mu$ at pH 12.8.

5.94 g. 2-N-methylguanosine were converted by the same procedure to 4.12 g. pure crystalline disodium 2-N-methylguanosine-5′-phosphate.

What we claim is:

1. A method of converting a nucleoside selected from the group consisting of ribonucleosides having hydroxyl groups in positions 2′ and 3′ and deoxyribonucleosides having a hydroxyl group in position 3′ to the corresponding nucleotide which comprises reacting said nucleoside with a phosphorylating agent selected from the group consisting of phosphoryl chloride and tetrachloropyrophosphate in the presence of at least four moles of a tertiary ester of phosphoric acid per mole of said nucleoside, the alcohol moieties of said ester being alkanols or monohaloalkanols; and hydrolyzing the phosphorochloridate formed by the reaction.

2. A method as set forth in claim 1, wherein said ester is normally liquid.

3. A method as set forth in claim 2, wherein said alcohol moieties have not more than ten carbon atoms each.

4. A method as set forth in claim 1, wherein said alcohol moieties are lower alkanols or lower monohaloalkanols.

5. A method as set forth in claim 1, wherein the amount of said ester is sufficient to dissolve said nucleoside and said phosphorylating agent.

6. A method as set forth in claim 1, wherein said nucleoside is reacted with said phosphorylating agent at a temperature of −30° C. to +50° C.

7. A method as set forth in claim 6, wherein the amount of said phosphorylating agent is one to five moles per mole of said nucleoside.

8. A method as set forth in claim 1, wherein said nucleoside is reacted with said phosphorylating agent in an acid medium.

9. A method as set forth in claim 1, wherein said nucleoside is reacted with said phosphorylation agent in the presence of acetone.

References Cited

UNITED STATES PATENTS

| | | | |
|---|---|---|---|
| 3,201,389 | 8/1965 | Fujimoto et al. | 260—211.5 |
| 3,282,920 | 11/1966 | Ouchi et al. | 260—211.5 |
| 3,288,780 | 11/1966 | Tsuchiya et al. | 260—211.5 |
| 3,290,285 | 12/1966 | Senoo et al. | 260—211.5 |

LEWIS GOTTS, *Primary Examiner.*

JOHNNIE R. BROWN, *Assistant Examiner.*